J. F. LUTZ.
ASH SIEVING DEVICE.
APPLICATION FILED OCT. 4, 1913.
1,096,044.
Patented May 12, 1914.
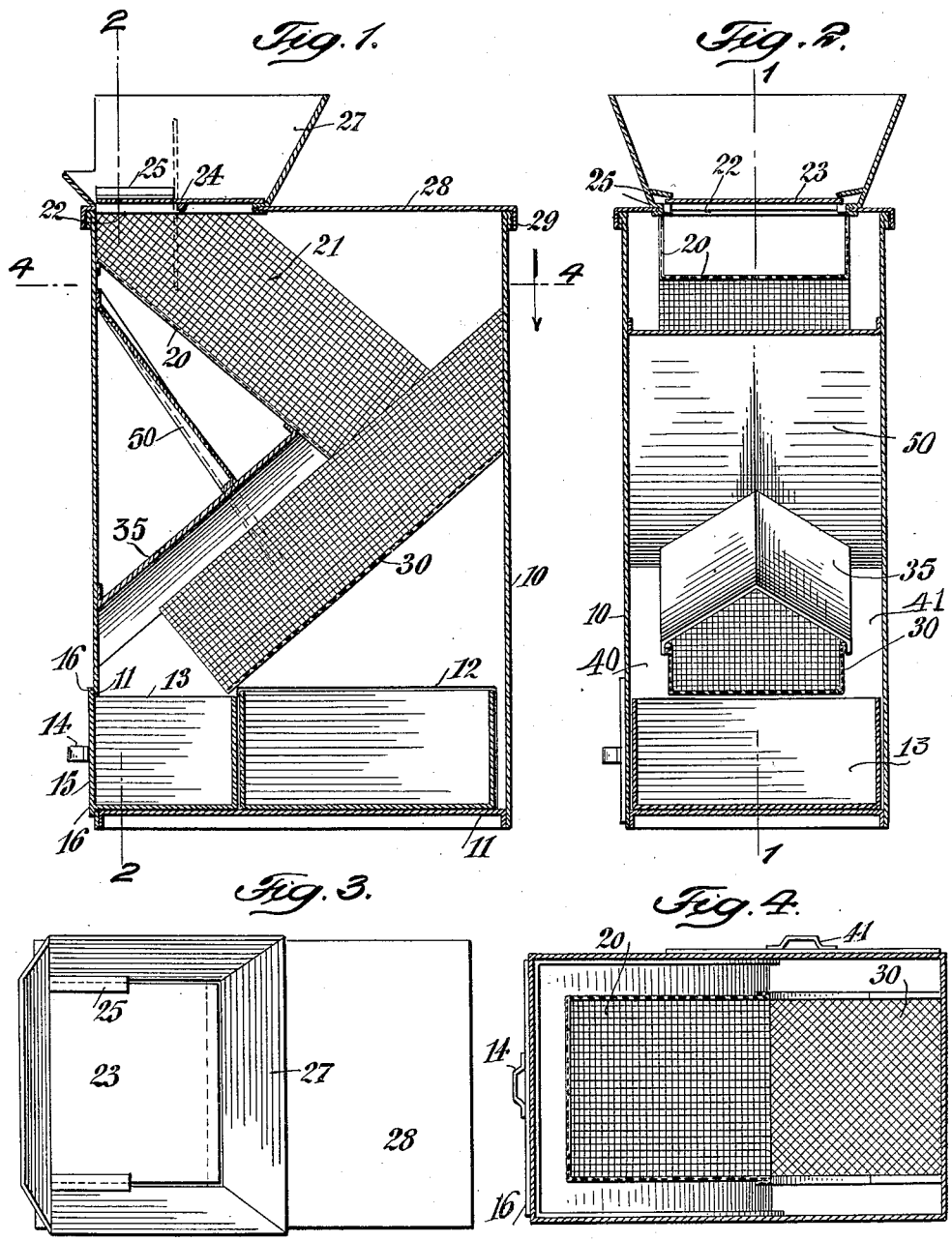

UNITED STATES PATENT OFFICE.

JACOB F. LUTZ, OF NEW YORK, N. Y.

ASH-SIEVING DEVICE.

1,096,044.      Specification of Letters Patent.      Patented May 12, 1914.

Application filed October 4, 1913. Serial No. 793,323.

*To all whom it may concern:*

Be it known that I, JACOB F. LUTZ, a citizen of the United States of America, residing in the borough of the Bronx, in the city of New York, in the county of Bronx and State of New York, have invented certain new and useful Improvements in Ash-Sieving Devices, of which the following is a specification.

This invention relates to an ash sifter especially adapted to household use for separating the unburned coal and ashes without the diffusion of dust.

In the accompanying drawing, Figure 1 shows a vertical longitudinal section of my improved device, Fig. 2 is a vertical transverse section taken on line 2—2 of Fig. 1, Fig. 3 is a plan-view, and Fig. 4 is a horizontal section taken on line 4—4 of Fig. 1.

Similar reference characters indicate corresponding parts throughout the different figures of the drawing.

Referring to the drawing, and more particularly to Fig. 1, the casing 10 is provided with a bottom 11 suitably secured thereto, on which bottom an ash-receiving receptacle or compartment 12 and an unburned-coal receiving compartment 13 having a handle 14 are arranged. The receptacle 13 is provided with a front-wall 15, which at its upper and lower ends 16 extends beyond the opening 17 in the front-wall and abuts against the same. The casing 10 extends upwardly and has arranged at the interior thereof a primary screen chute 20 having side-walls 21 of sieve-like material or suitable netting which is inclined downwardly from the upper portion of the casing toward the center portion thereof. This chute is shown in section in Fig. 2, and in this figure it is shown of rectangular cross-section. The upper end of this chute 20 has an opening 22 and through this the ashes and unburned coal are dropped, this opening 22 being adapted to be closed by a hinged top or door 23 hinged at the ends 24 which rest in sockets 25. This door 23 is so weighted that it may readily take the vertical position shown in dotted lines in Fig. 1, but after the contents have been emptied through the opening 22 this door will return to its initial or horizontal position. To prevent the spread of the ashes, the hopper 27 is provided, the lower end of which has an opening in registration with the opening 22. The top-wall 28 has its ends bent over, as shown by 29, to engage with the side-walls of the casing.

A secondary screen chute 30 is inclined in an opposite direction to the incline of the chute 20 and is preferably disposed at right angles thereto, its upper end being attached to a side wall of the casing and its lower end discharging into the receptacle 13 at the bottom thereof. The chute 30 is preferably U-shaped in cross section as shown in Fig. 2 and its bottom as well as its side walls are composed of reticulated material. This chute is narrower than the casing 10 and forms spaces 40 and 41 between its opposite sides and the walls of the casing. The chute 20 discharges at its lower end into the chute 30 near the upper end thereof. A gable-shaped ash deflector 35 surmounts and covers the chute 30, being connected at its upper end with the chute 20 near the lower end thereof is inclined downward therefrom in corresponding incline to the incline of the chute 30 and connected at its lower end with a wall of the casing 10. Another deflector 50 is inclined from a wall of the casing near the top of the chute 20 to the gable-shaped ash deflector 35 straddling the latter. Thus deflector 50 extends from side to side of the casing 10 leaving a space between itself and the bottom of the chute 20. The nettings of the inclined member 20 and the inclined member 30 are of different grade and arrangement.

The operation of this sifter is as follows: The waste from the stove or furnace including the ashes and the unburned fuel, is thrown into the hopper 27 and thereafter the door 24 is opened and said material enters the inclined chute 20 and slides by gravity therein, the larger fuel elements passing through said chute into the chute 30 and the ashes sifting through the bottom and sides of said chute into the space 43 between said chute and the deflector 50. Thence said ashes pass over the solid gable-shaped deflector 35, being guided thereby into the spaces 40 and 41 and falling through said spaces into the receptacle 12. The heavier solid particles delivered into the chute 30 pass down said chute into the receptacle 13 and the finer ashes which did not pass through the perforations or reticulations of the chute 20 pass through the bottoms and sides of the chute 30 into said receptacle 12. The coarse coal is thus collected in the compartment 13 and the ashes in the compart-

I claim:

1. An ash sifter comprising a casing, a downwardly inclined primary screen chute, a secondary screen chute inclined in an opposite direction to the incline of said primary chute and adapted to receive material therefrom, a gable-shaped ash deflector surmounting the lower part of said secondary screen chute and extending from the bottom of said primary screen chute to a side wall of the casing, and an inclined deflector of the full width of the casing disposed below said primary screen chute and connected at its lower end with a side wall of the casing and straddling at its lower end said gable-shaped deflector, said secondary screen chute and its gable-shaped deflector being narrower than the casing and forming passages for ashes on each side thereof.

2. An ash sifter comprising a casing, a downwardly inclined primary screen chute having screening material in its bottom and sides, a secondary screen chute also having screening material in its bottom and sides and inclined in an opposite direction to the incline of said primary screen chute and adapted to receive material therefrom, a gable-shaped ash deflector surmounting the lower part of said secondary screen chute and extending from the bottom of said primary screen chute to a side wall of the casing, and an inclined deflector of the full width of the casing disposed below said primary screen chute and connected at its lower end with a side wall of the casing and straddling at its lower end said gable-shaped deflector, said secondary screen chute and its gable-shaped deflector being narrower than the casing and forming passages for ashes on each side thereof.

In testimony, that I claim the foregoing as my invention, I have signed my name in presence of two subscribing witnesses.

JACOB F. LUTZ.

Witnesses:
C. P. GOEPEL,
F. HOGG.